(12) United States Patent
Bury et al.

(10) Patent No.: US 6,442,641 B1
(45) Date of Patent: Aug. 27, 2002

(54) HANDLING MULTIPLE DELAYED WRITE TRANSACTIONS SIMULTANEOUSLY THROUGH A BRIDGE

(75) Inventors: James R Bury; Nick G Eskandari, both of Chandler; Jeffrey J McCoskey, Phoenix, all of AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/327,986

(22) Filed: Jun. 8, 1999

(51) Int. Cl.[7] .............................................. G06F 13/38
(52) U.S. Cl. ...................................... 710/305; 710/310
(58) Field of Search ................................ 710/305, 306, 710/309, 310, 311, 312

(56) References Cited

U.S. PATENT DOCUMENTS

| | | | | |
|---|---|---|---|---|
| 5,815,677 A | * | 9/1998 | Goodrum | 710/126 |
| 5,832,241 A | * | 11/1998 | Guy et al. | 710/112 |
| 5,832,243 A | * | 11/1998 | Seeman | 710/128 |
| 6,219,737 B1 | * | 4/2001 | Chen et al. | 710/129 |
| 6,230,219 B1 | * | 5/2001 | Fields, Jr. et al. | 710/22 |
| 6,230,228 B1 | * | 5/2001 | Eskandari et al. | 710/129 |
| 6,260,095 B1 | * | 7/2001 | Goodrum | 710/129 |

\* cited by examiner

*Primary Examiner*—Peter Wong
*Assistant Examiner*—X. Chung-Trans
(74) *Attorney, Agent, or Firm*—Blakely, Sokoloff, Taylor & Zafman LLP

(57) ABSTRACT

An embodiment of the invention is directed at a method of processing multiple delayed write transactions, such as PCI transactions, by a bridge. The method involves receiving a number of requests for delayed write transactions on an initiating side of the bridge, and storing received transaction information for each of the requests in a separate one of a number of storage elements. An element containing newly received transaction information is marked valid if no received transaction information in other elements matches the newly received transaction information. Then, a delayed write transaction corresponding to the valid element is mastered on a target side of the bridge. If the corresponding delayed write transaction is completed on the target side, then the valid element is marked as complete. Thereafter, a new request received on the initiating side is signaled a successful termination if received transaction information for the new request matches that stored in the valid and complete element.

23 Claims, 5 Drawing Sheets

HANDLING MULTIPLE DELAYED WRITE TRANSACTIONS SIMULTANEOUSLY THROUGH A BRIDGE

This invention is generally related to bridges used for communication between separate buses, and more particularly to simultaneously handling multiple delayed write transactions through a bridge.

BACKGROUND INFORMATION

The performance of electronic systems can be enhanced through the use of multiple buses that allow a larger number of devices to become part of the system. Devices on one bus communicate with devices on a physically separate bus through a bridge. Transactions across the bridge are requested by an initiator coupled to an initiating bus, and are directed at a target coupled to a target bus on the other side of the bridge. Transaction data being transferred between the initiator and the target is received one portion at a time by the bridge and stored in a buffer before being forwarded to the other side of the bridge.

One type of transaction that is particularly common in such systems is the delayed write transaction. Such a transaction may be one which complies with the popular Peripheral Component Interconnect (PCI) Specification, Rev. 2.1, Jun. 1, 1995. Typically, after an initial PCI delayed write transaction is requested on the initiating bus, the bridge claims the transaction by latching address and command type information associated with this initial request. In addition, the bridge will capture a predefined amount of data, such as a single data word, and then terminates the transaction by signaling a retry termination in response to the request. The retry termination indicates to the initiator that the transaction has not been completed. Meanwhile, the bridge initiates a transaction on the target bus in an attempt to transfer the buffered data to the target. When the target becomes available, the bridge transfers the portion of data from its buffer to the target and the transaction is deemed completed on the target bus. Thereafter, if the initiator returns and repeats the initial transaction request, the bridge once again accepts an initial portion of data from the initiator, but this time signals a successful, rather than a retry, termination in response to the repeated request. This successful termination signifies to the initiator that its transaction has been completed.

In conventional PCI bridges, a delayed write transaction must be completed on the initiating bus before subsequent delayed write transactions can be accepted in the same direction across the bridge. Such a solution, however, creates a performance bottleneck in systems with relatively high bridge traffic, such as network servers.

SUMMARY

Accordingly, an embodiment of the invention is directed at a method of processing multiple delayed write transactions by a bridge. The method involves receiving a number of requests for delayed write transactions on an initiating side of the bridge, and storing received transaction information for each of the requests in a separate one of a number of storage elements. An element containing newly received transaction information is marked valid if no received transaction information in other elements matches the newly received transaction information. Then, a delayed write transaction corresponding to the valid element is mastered on a target side of the bridge. If the corresponding delayed write transaction is completed on the target side, then the valid element is marked as complete. Thereafter, a new request received on the initiating side is signaled a successful termination if received transaction information for the new request matches that stored in the valid and complete element.

DETAILED DESCRIPTION

An embodiment of the invention is directed at a method of handling multiple delayed write transactions simultaneously in the same direction across a bridge to promote greater data throughput for such transactions. The method summarized above has a particular advantage when implemented using hard-wired logic, because it uses a relatively small number of logic gates. In addition, the bridge design proves to be a scalable implementation which can be easily adjusted during design to accommodate greater or less traffic in delayed write transactions.

Figure 1:
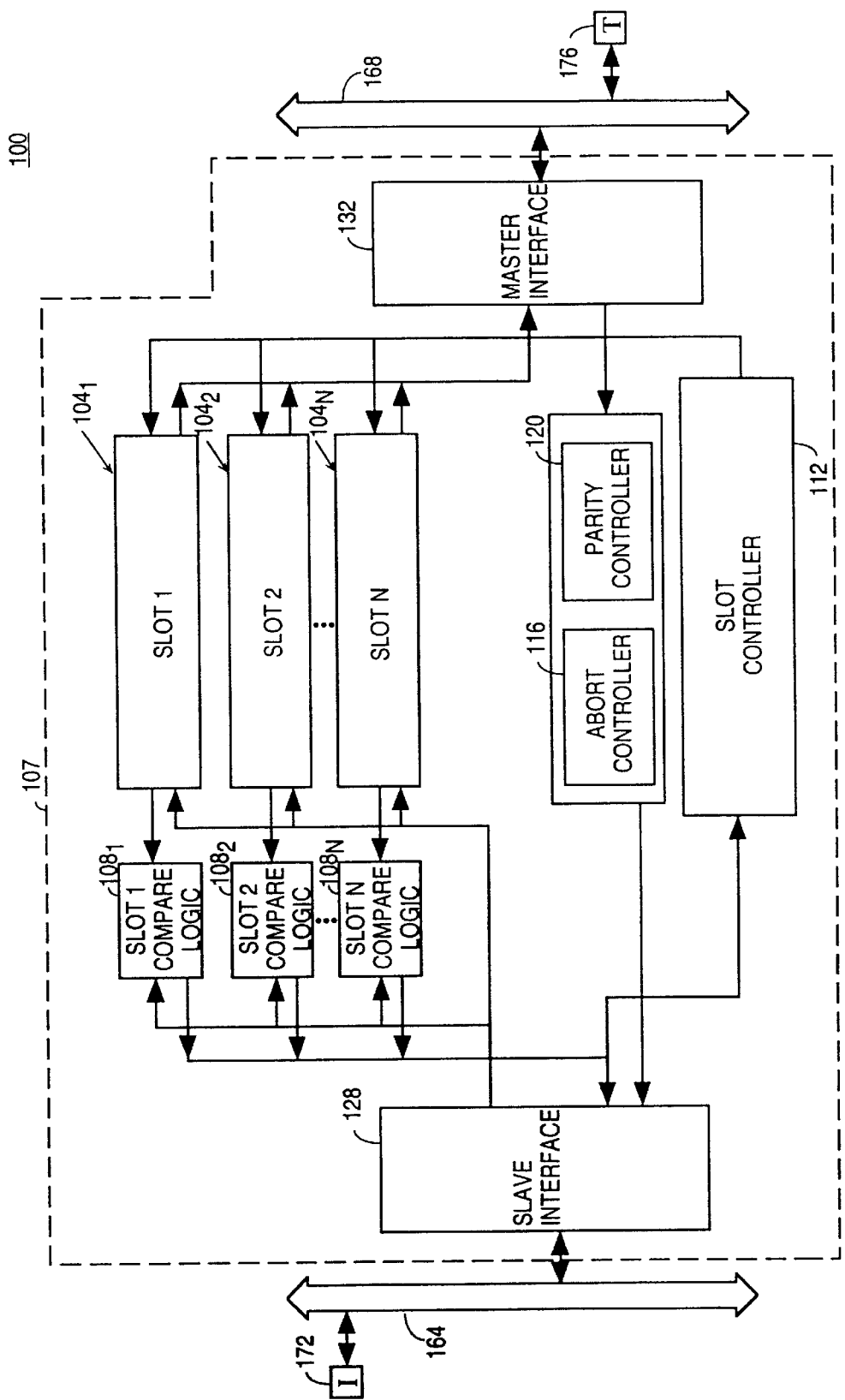
FIG. 1 illustrates a logical block diagram of a bridge according to an embodiment of the invention.

FIG. 1 illustrates a block diagram of an electronic system 100 having a bridge 107 according to an embodiment of the invention. The system 100 features an initiating bus 164 and a target bus 168 on either side of the bridge 107. An initiator 172 is coupled to the initiating bus and a target 176 is coupled to the target bus. The roles of the initiator and the target may be played by a wide range of devices, including processors, memory, I/O devices such as serial or parallel port controllers, mass storage controllers, and network interface controllers. On the initiating side of the bridge, a slave interface 128 receives requests for delayed write transactions over the initiating bus 164. On the target side, a master interface 132 is used for mastering delayed write transactions that have been transported from the initiating side and that are directed at the target 176 on the target bus 168. The bridge 100 also contains a number of transaction information storage elements and transaction data storage elements coupled between the master and slave interfaces. In the embodiment shown in FIG. 1, a number of slots $104_1$, $104_2$, ... $104_N$, ($104_i$) are provided that represent these storage elements. In this embodiment, each slot represents a transaction information storage element and a transaction data storage element. Each of the transaction information storage elements is for storing the transaction information of a respective one of a number of requests received by the slave interface 128. Similarly, each of the transaction data storage elements is for storing the transaction data of a respective one of the requests. Normally, the slots $104_i$ are art of a buffer having a first in first out structure, also known as a queue, to facilitate the orderly completion of transactions that are stored in the slots. However, the invention is not limited to a queue if the transactions may be mastered in any order.

In a particular embodiment, the enqueued transactions in the slots $104_i$, are mastered in a first-in-first-out basis with respect to the order in which they were received by the slave interface. The slots $104_i$ are managed by a slot controller 112. The queue permits the slot controller 112 to keep track of the oldest and youngest delayed write transactions in the slots $104_i$. The slot controller instructs the master interface to select transactions from the head of the queue, and causes new requests to be stored in the tail of the queue. Comparison logic is also provided to determine whether the transaction information of a new request received by the slave interface matches existing transaction information in any of the slots. In the embodiment shown in FIG. 1, the comparison logic is shown as a number of identical logic blocks $108_1, 108_2, \ldots 108_N$ ($108_i$). Each of the blocks 108i has a first input coupled to a respective one of the transaction information storage elements and a second input coupled to the slave interface 128, and an output coupled to the slot controller 112 and the slave interface. Each of the blocks $108_i$ makes a comparison using existing transaction information in its corresponding slot $104_i$, and provides an indication to the slot controller 112 as to whether or not the two match.

The bridge 107 also contains an abort controller 116 and a parity controller 120.

The parity controller 120 may be programmed to ignore or respond to parity errors associated with both address and data received by the master interface 132. In addition, the parity controller 120 may be further programmed to ignore or respond to errors seen by the slave interface 128. Such errors can be programmed to be forwarded to the opposite interface according to techniques known in the art used in bridges that support only a single pending delayed write transaction at a time.

An indication of whether or not a parity error has been encountered is preferably stored in the slot $104_i$ associated with the delayed write transaction that is in error. The parity controller 120 may be programmed to preclude the slave interface 128 from claiming transactions which have an address parity error. If a data parity error is seen by the slave interface 128, the bridge 100 will nonetheless claim the transaction. However, the bridge will not place the associated transaction information into a slot $104_i$. Accordingly, such a transaction having a data parity error on the initiating bus 164 is not forwarded to the target 176. The bridge 100 instead will signal an abort termination to the initiator 172, and will transfer the A erroneous data back to the initiator. No bad data is written to the target device 176, thus preserving system data integrity.

The abort controller 116 is in part responsible for determining the termination type, other than a retry, to be signaled on the initiating bus 164 in response to a transaction request that matches an existing transaction in one of the slots $104_i$. In the present embodiments, four basic types of terminations are contemplated:

| Return Termination Type | Conditions |
| --- | --- |
| Disconnect | Data transferred successfully to target with error. |
| Master abort | No such target exists. |
| Target abort | Target exists but does not support this transaction. |
| As reported by target | Error in address or data |

The return termination type for each transaction is normally set in its corresponding slot $104_i$ under the direction of the abort controller 116.

Figure 2:
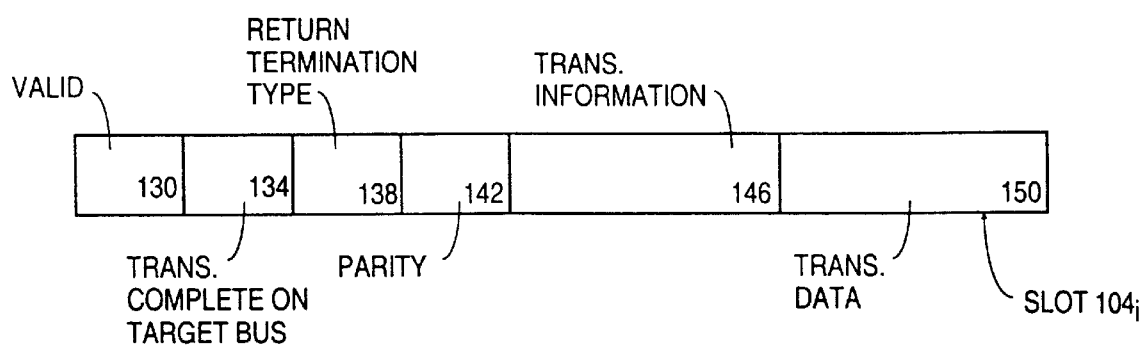
FIG. 2 shows an exemplary slot in the bridge.

FIG. 2 shows an exemplary slot $104_i$ of the bridge 100. The slot $104_i$ has a number of bit fields that are used to store information needed for processing its corresponding delayed write transaction. Field 130 is marked Valid if the transaction information of a new request matches existing transaction information in a field 146 of this slot. Once the slot $104_i$ is marked Valid, the storage element associated with it becomes unavailable to store the transaction information of a new request received by the slave interface. Furthermore, only if a slot is marked Valid can its delayed write transaction become available for mastering on the target side. Upon completion of this transaction on the target side of the bridge, the Valid slot $104_i$ is marked Complete in a field 134. Thereafter, when a new request is received by the slave interface, and if the transaction information of the new request matches existing transaction information in the Valid slot $104_i$ that is also marked Complete, then the slave interface is instructed to signal a successful termination in response to the new request. The field 130 in the slot $104_i$ may then be marked invalid in response to this successful termination.

The slot $104_i$ also contains a field 138 that indicates the return termination type, other than a retry, as set by the abort controller 116 and as discussed earlier. A 20 field 142 is used to indicate the parity associated with the transaction information and/or transaction data of the slot $104_i$. The transaction information is stored in a field 146 and the transaction data is stored in a field 150. The transaction information includes at least the address of the target device, and may also include the command type for the transaction. The command types that are specific to the PCI embodiment of the invention include an I/O write and a configuration write, both being delayed write transactions. The transaction data field 150 will be sufficiently large to allow storage of a predefined portion of data, such as a data word, that is to be written to the target device.

Figure 3:
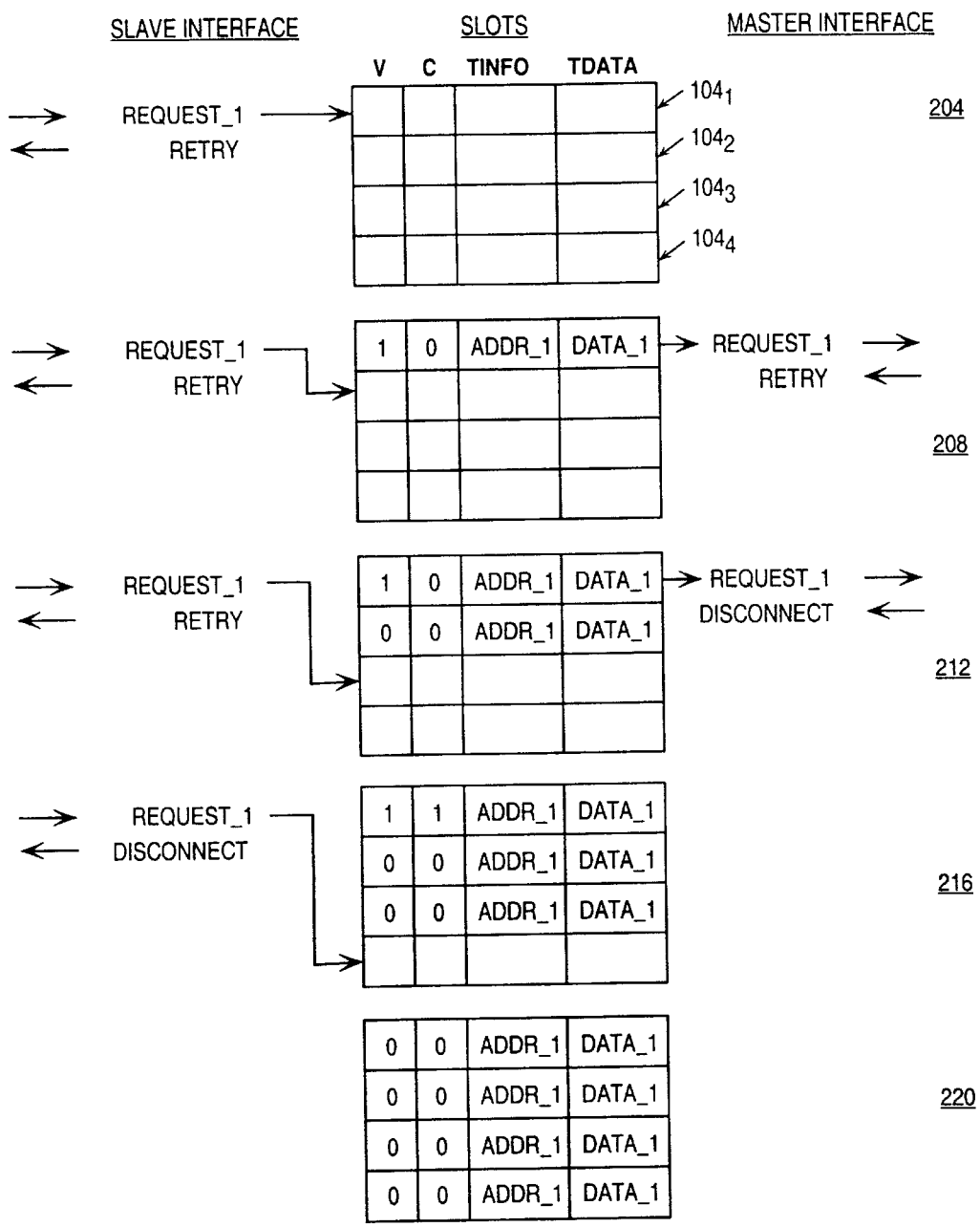
FIG. 3 illustrates a number of states of the slots in a bridge, together with exemplary slave and master interface activity.

FIG. 3 illustrates a number of states of the slots $104_i$ together with slave and master interface activity according to an embodiment of the invention. A time line represented by time intervals 204, 208, . . . 220 is shown, together with the state of the slots $104_i$ and any interface activity in each such interval. Operation begins in interval 204 where the slots $104_i$ have been initialized to empty. A first request for a delayed write transaction is received on the initiating side of the bridge, as indicated by request_1. The transaction information ADDR_1 of the first request is stored in the TINFO field 146 of an available slot, here slot $104_i$. The transaction data of the first request is stored in the TDATA field 150 of the same slot. The slot $104_1$ was available because its Valid bit was clear when the first request was received in interval 204. The slot $104_1$ is assigned to the first request and its corresponding delayed write transaction. In addition, the Valid bit is set because ADDR_1 matches no existing transaction information in the other slots. After the transaction information and data of the first request have been latched in this way, a retry termination is signaled by the slave interface. The condition of the slots are then as shown in the next interval 208.

In the interval 208, the master interface selects the transaction of slot $104_1$ for mastering, because its Valid bit is set. Accordingly, the request_1 is driven onto the target bus. In this case, assume that the target signals a retry termination as it may not be ready to accept the write data. During the same interval 208, the slave interface receives a repeated first request for the transaction in slot $104_1$. The transaction information and transaction data of this newly received request are stored in an available slot, here slot $104_2$, regardless of whether the transaction information matches any existing transaction information in the slots. Note that slot $104_1$ is not available because its Valid bit is set. A retry termination is then signaled in response to the repeated request from the initiator. The state of the slots thus change into that shown in interval 212.

Once again, in the interval 212, since the Valid bit for the slot $104_1$ is set, the bridge attempts to master the associated transaction by sending another request_1 to the target. This time, the target accepts DATA_1 from the bridge and signals a successful termination, as represented by a Disconnect received by the master interface of the bridge. Receiving the Disconnect causes the Completion bit for the slot $104_1$ to be set. In addition, in the same interval 212, a third request_1 from the initiator is received by the slave interface. The transaction information and data for this third request are latched into an available slot, here slot $104_3$, and a retry termination is immediately signaled by the bridge's slave interface. The conditions of the slots thus change to that shown in interval 216.

As seen in the interval 216, the slots contain three identical enqueued transactions, but only one slot is marked both Valid and Complete. In the interval 216, a fourth request_1 is received by the slave interface. The transaction information and data are accordingly stored in an available slot, here $104_4$. Since the transaction information of this fourth request matches existing information in slot $104_1$, and since slot $104_i$ is marked Complete, the slave interface is instructed to signal a successful termination in response to the request_1. This signifies that the transaction involving ADDR_1 and DATA_1 has been successfully completed on the initiating side of the bridge. The Valid and Completion fields of the slot $104_1$ are then cleared, leaving the slots in the condition shown in the interval 220. Note that in both of the intervals 216 and 220, the master interface attempts no delayed write transaction because the Valid bits in slots 2–4 are clear and both Valid and Complete bits in slot 1 are set.

Figure 4:
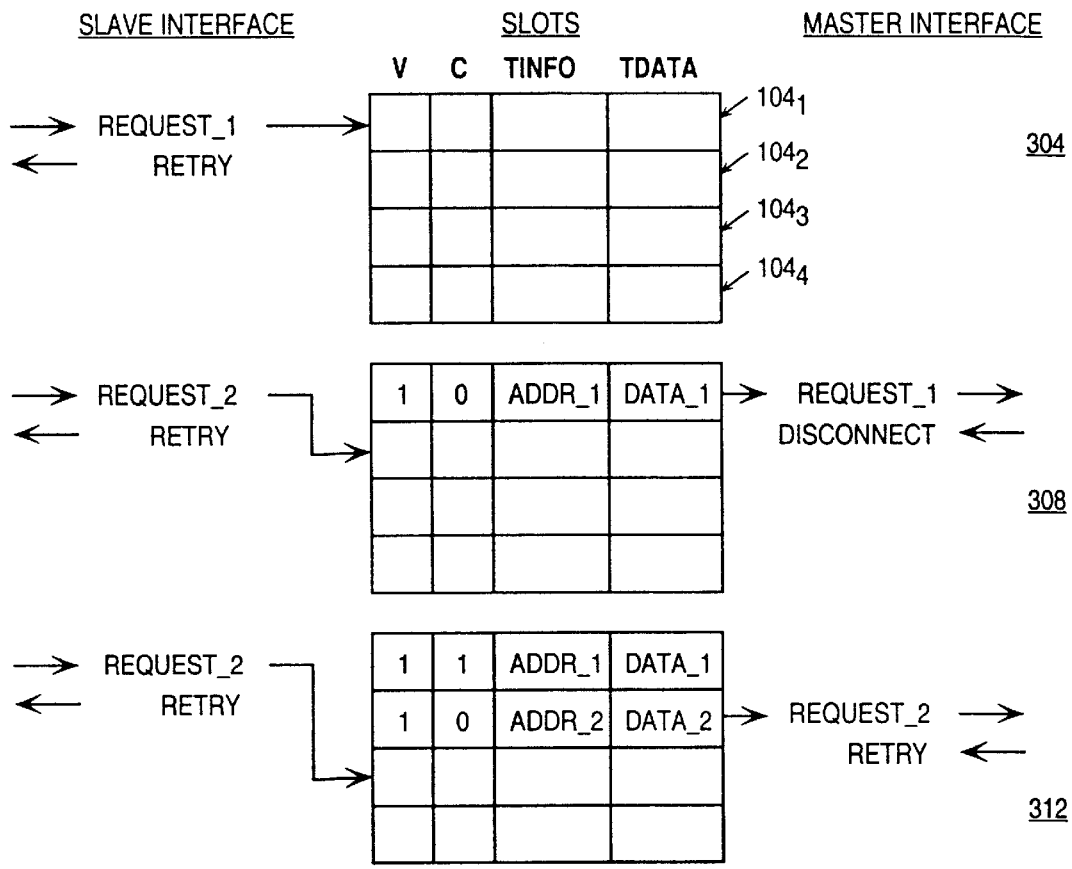
FIGS. 4 and 5 illustrate further states of the slots and further bridge activity according to another embodiment of the invention.
Figure 5:
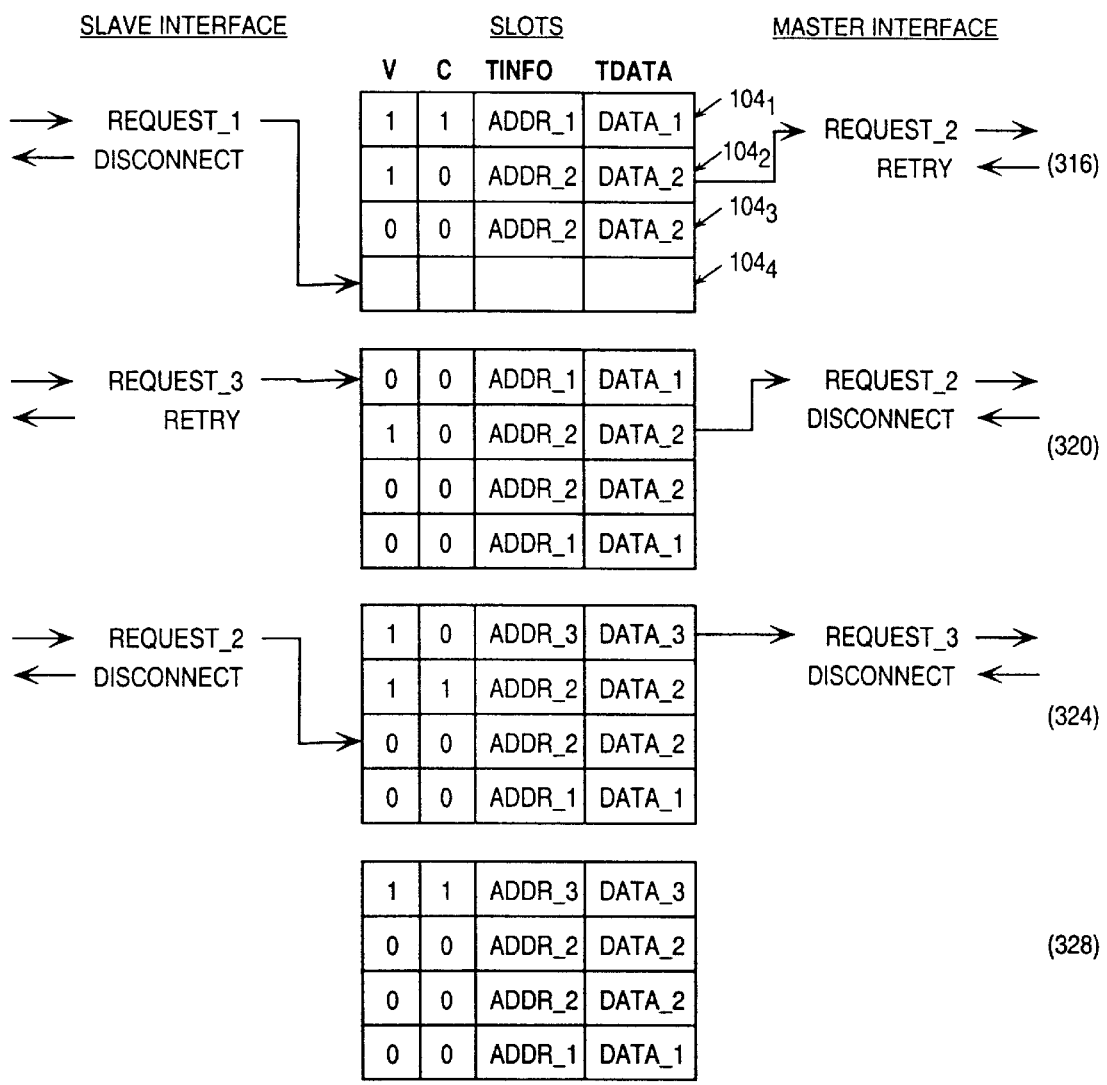

Turning now to FIGS. 4 and 5, another sequence of bridge transactions is shown to illustrate additional features of an embodiment of the invention. Once again, the slots are initialized to empty in the interval 304. A first request_1 is received by the slave interface, and as no existing transaction information matches that of the received request, a retry termination is signaled. The transaction information and data are latched and stored in an available slot, being slot $104_1$ in this case. The state of the slots then changes into that shown in the interval 308.

In the interval 308, the transaction corresponding to the slot $104_1$ is available, so that the master interface initiates a request_1 to the target. Here, the target accepts the DATA_1 and signals a Disconnect to the bridge's master interface. In the same interval 308, the slave interface receives a request_2. The request_2 is for a different transaction than the request_1. Thus, since the transaction information of the request_2 does not match any existing transaction information in any of the slots, the slave interface is instructed to immediately signal a retry termination. The state of the slots thus changes to that shown in the interval 312.

In the interval 312, there is a Valid enqueued transaction in the slot $104_2$. Thus, the master interface initiates a request_2 to the target. For this case, assume that the target is not ready to complete the transaction, and therefore immediately signals a retry termination. Turning to the slave interface, a new request_2 is received for the same transaction that is enqueued in the slot $104_2$. Although the newly received transaction information matches that in slot $104_2$, the slave interface is nonetheless instructed to signal a retry termination because the slot $104_2$ has not been marked Complete. The condition of the slots thus changes into that shown in the interval 316 of FIG. 5.

In the interval 316, the slot $104_2$ is Valid and not yet Complete. Therefore, the master interface initiates a request_2 for a transaction corresponding to the slot $104_2$. Once again, assume for this case that the target is not ready such that an immediate retry termination is signaled. Turning to the slave interface, the initiator of the transaction having ADDR_1 has finally returned with a repeated request_1. Because the transaction information in this repeated request_1 matches ADDR_1 of slot $104_1$, and because this slot is marked Complete, the slave interface is instructed to signal a Disconnect termination in response to the repeated request_1. The transaction in slot $104_1$ has thus been successfully terminated on the initiating side, so that the completion bit in slot $104_1$ is cleared. The status of the slots has thus changed into that shown in interval 320.

In the interval 320, only the slot $104_2$ is Valid. The master interface accordingly initiates a request_2 to the target. This time, the target successfully completes the transaction by accepting the DATA_2 and signaling a Disconnect termination. The latter causes the slot $104_2$ to be marked Complete. Turning to the slave interface, a new request_3 for a third transaction has been received. Since the transaction information of this new request matches no existing transaction information in any of the slots, the first available slot, being slot $104_1$ in this case, is used to store the incoming transaction information and data. When the slots fill up as in interval 320, any new requests on the initiating side are retried with no transaction information being captured. The status of the slots then changes into that shown in interval 324.

In the interval 324, only one slot has an available transaction to be mastered, and that is slot $104_1$. The master interface accordingly initiates a request_3 to the target, and receives a Disconnect signifying a successful completion. At the slave interface, a repeated request_2 is received and promptly latched into an available slot, here slot $104_3$. Since the slot $104_2$ refers to the same transaction and is marked Complete, then the slave interface is instructed to signal a Disconnect termination. The status of the slots thus changes into that shown in interval 328.

To summarize, various embodiments of the invention for processing multiple delayed write transactions in an efficient manner by a bridge have been disclosed. The embodiments described are, of course, subject to some variations in structure and implementation. For instance, although the transaction data for each of the requests is illustrated as stored inside a slot that also contains its associated transaction information, a different architecture may be used in which the transaction data for all requests are stored in a separate memory portion than their associated transaction information. In addition, the bridge as a whole may be implemented in hard-wired logic circuitry. An alternative implementation may be a processor having sufficiently high performance to execute a series of instructions that implement the functionality described above. Finally, the bus transactions described above use terminology (e.g., retry and disconnect) which may be specific to the PCI specification. However, the concepts described above may also apply to bus specifications other than the PCI specification. It is intended that all such modifications and variations falling within the spirit and scope of the invention be covered by the appended claims.

What is claimed is:

1. A method of processing transactions by a bridge, comprising:

receiving a plurality of requests for delayed write transactions on an initiating side of the bridge;

storing received transaction information for each of the requests in one of a plurality of storage elements;

marking as valid each storage element that contains newly received transaction information if no previously received transaction information stored in any other elements matches the newly received transaction information; and then mastering on a target side of the bridge transaction corresponding to one of the plurality of storage elements only if that element is marked as being valid; and then marking as complete the valid element if the corresponding transaction is completed on the target side; and then signaling a successful termination to a new request received on the initiating side if received transaction information for the new request matches that stored in said valid and complete element.

2. The method of claim 1 wherein the mastering of the delayed write transactions occurs in a first-in-first-out manner with respect to receiving the requests.

3. The method of claim 1 further comprising storing received transaction data for each of the requests prior to terminating each of the requests.

4. The method of claim 3 wherein the terminating includes signaling a retry termination on the initiating side of the bridge.

5. The method of claim 3 wherein the received transaction data for each of the requests is stored in a separate one of the storage elements that also contains corresponding received transaction information.

6. The method of claim 1 wherein each of the storage elements indicates a type of termination to be signaled in response to a new request whose received transaction information matches that stored in the element and was received on the initiating side.

7. The method of claim 3 wherein each element indicates errors, if any, in the transaction information and transaction data stored in the element.

8. The method of claim 1 wherein the successful termination is a disconnect termination.

9. A method of processing delayed write transactions through a bridge, comprising:

storing transaction information of a first request for a delayed write transaction received on an initiating side of the bridge;

assigning an available first one of a plurality of slots to the first request;

storing transaction data of the first request;

marking the first slot as valid if the transaction information matches no existing transaction information, the first slot being unavailable if marked valid;

signaling a first retry termination to the first request;

storing transaction information and transaction data of a second request for a delayed write transaction, an address portion of the transaction information and the transaction data of the second request being the same as a corresponding address portion and transaction data of the first request;

assigning an available second one of the slots to the second request;

signaling a second retry termination to the second request;

transferring transaction data of the first request through a target side of the bridge as a complete transaction, based on transaction information of the first request; and then marking the first slot as complete;

receiving transaction information and transaction data of a third request for a delayed write transaction; and signaling a normal termination in response to the third request, where transaction information of the third request matches the transaction information of the first request and the first slot is marked complete.

10. The method of claim 9 wherein the transaction information of the first and second requests is stored in the first and second slot, respectively.

11. The method of claim 10 wherein the transaction data of the first and second requests is stored in the first and second slots, respectively.

12. The method of claim 10 wherein the signaling of the second retry termination is in response to no slot having transaction information that matches transaction information of the second request and being marked complete.

13. The method of claim 12 wherein the matching transaction information includes matching target addresses.

14. The method of claim 9 wherein an address portion of the transaction formation and the transaction data of the second request and the third request are the same as a corresponding address portion and transaction data of the first request.

15. A bridge comprising:

a slave interface that receives a plurality of requests for delayed write transactions and transaction information and transaction data of said requests, and in response signals terminations for said delayed write transactions;

a plurality of transaction information storage elements coupled to the slave interface, each storing the transaction information of a respective one of said requests;

a plurality of transaction data storage elements coupled to the slave interface, by each storing the transaction data of a respective one of said requests;

a master interface-coupled to the storage elements for mastering said delayed write transactions by driving part of the transaction information and the transaction data from selected ones of the storage elements;

comparison logic coupled to the storage elements and the slave interface and that indicates whether the transaction information of a new request received by the slave interface matches existing transaction information in the storage elements; and controller logic coupled to the slave interface, the storage elements, and the comparison logic, and that causes the storage element which stores the transaction information of the new request to be marked valid if the transaction information of the new request matches no existing transaction information in other storage elements, wherein once a storage element is marked valid it becomes unavailable to store the transaction information of a new request, and its associated delayed write transaction becomes available for mastering by the master interface and upon completion of the associated delayed write transaction the valid storage element is marked complete, and wherein the slave interface signals a successful termination to a new request if the transaction information of the new request matches existing transaction information in one of the storage elements which is also marked complete.

16. The bridge of claim 15 wherein the comparison logic includes a plurality of identical compare logic blocks each having a first input coupled to a respective one of the transaction information storage elements and a second input coupled to the slave interface, and an output coupled to the controller logic.

17. The bridge of claim 15 wherein the storage element having existing transaction information that matches the transaction information of the new request is marked invalid in response to the successful termination.

18. The bridge of claim 15 wherein the mastering of said delayed write transactions by the master interface is performed in a first-in-first-out manner as the requests are received by the slave interface.

19. An electronic system comprising:

first bus;

second bus;

initiator device coupled to the first bus;

target device coupled to the second bus; and bridge having an initiating side coupled to the first bus and a target side coupled to the second bus, the bridge being configured to receive a plurality of requests for delayed write transactions on the initiating side, store received transaction information for each of the requests in a separate one of a plurality of storage elements, mark as valid each one of the elements containing newly received transaction information if no previously received transaction information stored in any other of the elements matches the newly received transaction information, and then master on the target side a delayed write transaction corresponding to one of the elements only if that element is marked as being valid, and then mark as complete the valid element if the corresponding delayed write transaction is completed on the target side, and then signal a successful termination to a new request received on the initiating side if received transaction information for the new request matches that stored in said valid and complete element.

20. The system of claim 19 wherein the mastering of the delayed write transactions by the bridge occurs in a first-in-first-out manner with respect to receiving the requests from the initiator device.

21. The system of claim 19 wherein the bridge terminates each of the requests by signaling a retry termination.

22. The system of claim 19 wherein the successful termination is a disconnect termination.

23. The system of claim 19 wherein the initiator device includes a host processor and the target device includes a network interface controller.

* * * * *

UNITED STATES PATENT AND TRADEMARK OFFICE
CERTIFICATE OF CORRECTION

PATENT NO. : 6,442,641 B1
DATED : August 27, 2002
INVENTOR(S) : Bury et al.

It is certified that error appears in the above-identified patent and that said Letters Patent is hereby corrected as shown below:

<u>Column 2,</u>
Line 58, delete "art", insert -- part --.

Signed and Sealed this

Eighteenth Day of February, 2003

JAMES E. ROGAN
*Director of the United States Patent and Trademark Office*